United States Patent [19]

Umemoto et al.

[11] Patent Number: 4,979,200

[45] Date of Patent: Dec. 18, 1990

[54] RADIOGRAPHIC INTENSIFYING SCREEN

[75] Inventors: Akio Umemoto, Oi; Yuji Aoki, Odawara; Katuyosi Numata, Aikawa; Hideo Suzuki, Odawara, all of Japan

[73] Assignee: Kasei Optonix, Ltd., Tokyo, Japan

[21] Appl. No.: 425,045

[22] Filed: Oct. 23, 1989

[30] Foreign Application Priority Data

Oct. 27, 1988 [JP] Japan ................................ 63-269601

[51] Int. Cl.$^5$ .......................... G03B 42/04; G01J 1/58; G01N 21/64

[52] U.S. Cl. .................................. 378/185; 250/483.1

[58] Field of Search .............................. 378/182, 185; 250/483.1, 484.1, 486.1, 484.1 R

[56] References Cited

U.S. PATENT DOCUMENTS 4,574,102 3/1986 Arakawa et al. ................ 250/483.1

*Primary Examiner*—Janice A. Howell

*Assistant Examiner*—Don Wong

*Attorney, Agent, or Firm*—Oblon, Spivak, McClelland, Maier & Neustadt

[57] ABSTRACT

A radiographic intensifying screen which comprises a support, a fluorescent layer formed thereon comprising an X-ray luminescent phosphor and a binder resin supporting the X-ray luminescent phosphor in a dispersed state, and a protective layer formed on the fluorescent layer, wherein the proportion of the binder resin to the X-ray luminescent phosphor is within a range of from 4 to 8% by weight on the average of the entire fluorescent layer, and the binder resin is unevenly distributed in the fluorescent layer so that the proportion of the binder resin to the X-ray luminescent phosphor in the fluorescent layer in the vicinity of the protective layer is higher than the proportion of the binder resin to the X-ray excitable phosphor in the remainder of the fluorescent layer.

5 Claims, No Drawings

RADIOGRAPHIC INTENSIFYING SCREEN

BACKGROUND OF THE INVENTION

The present invention relates to an improvement of a radiographic intensifying screen (hereinafter referred to simply as an "intensifying screen").

The intensifying screen has a structure wherein a fluorescent layer comprising an X-ray luminescent phosphor i.e. a phosphor which is capable of instantaneously emitting a light of high luminance when excited by X-ray radiation (hereinafter referred to as "X-ray phosphor"), and a binder resin, is formed on a support made of paper, a plastic or the like, and a thin plastic protective layer which is capable of transmitting a light, is formed thereon. It is used for medical diagnosis or for non-destructive inspection of materials to convert an X-ray image of an object to a visible image and record it on an X-ray photographic film.

For such an intensifying screen, it is known that if the content of the binder resin in the fluorescent layer is reduced (i.e. if the content of the X-ray phosphor is increased), the speed of the intensifying screen and the image quality, particularly the sharpness, will be correspondingly improved. However, X-ray phosphor particles are usually uniformly dispersed in the binder resin substantially throughout the entire area of the fluorescent layer. Accordingly, if the content of the binder resin in the fluorescent layer is reduced to improve the sharpness of the intensifying screen, the probability of the phosphor particles being exposed to the surface of the fluorescent layer becomes correspondingly high. If a protective layer made of a thin film separately formed is bonded to the surface of such a fluorescent layer to produce an intensifying screen, no adequate bonding strength will be obtained between the fluorescent layer and the protective layer, and there has been a problem that the protective layer is likely to be peeled from the fluorescent layer by repeated use.

It is an object of the present invention to provide an intensifying screen having a protective layer bonded on the surface of a fluorescent layer, whereby the sharpness is improved by reducing the content of the binder resin in the fluorescent layer to a level lower than the average content in conventional intensifying screens and the adhesive strength between the fluorescent layer and the protective layer is strengthened by unevenly distributing the binder resin in the fluorescent layer.

The above object of the present invention can be attained by reducing the content of the binder resin contained in the fluorescent layer of an intensifying screen to a level lower than the content of the binder resin in conventional usual intensifying screens and unevenly distributing the binder resin in the fluorescent layer towards the protective layer side so that the distribution of the binder resin in the fluorescent layer is relatively large at the protective layer side.

Namely, the present invention provides a radiographic intensifying screen which comprises a support, a fluorescent layer formed thereon comprising an X-ray excitable phosphor and a binder resin supporting the X-ray phosphor in a dispersed state, and a protective layer formed on the fluorescent layer, wherein the proportion of the binder resin to the X-ray phosphor is within a range of from 4 to 8% by weight on the average of the entire fluorescent layer, and the binder resin is unevenly distributed in the fluorescent layer so that the proportion of the binder resin to the X-ray phosphor in the fluorescent layer in the vicinity of the protective layer is higher than the proportion of the binder resin to the X-ray phophor in the remainder of the fluorescent layer.

Now, the present invention will be described in detail with reference to the preferred embodiments.

For the production of the intensifying screen of the present invention, firstly the X-ray phosphor and the binder resin are mixed, then a suitable amount of a solvent is added to prepare a coating dispersion of the phosphor having a proper viscosity. This coating dispersion of the phosphor is coated on a support made of e.g. paper or plastics such as polyester such as polyethyleneterephthalate, polystyrene, polyamide or polycarbonate by a roll coater or a knife coater. At this time, the viscosity, the drying rate, etc. of the coating dispersion of the phosphor are adjusted so that a part of the X-ray phosphor is sedimented prior to the solidification of the coated layer of the coating dispersion of the phosphor so as to form a fluorescent layer in which the content of the binder resin in the vicinity of the surface of the fluorescent layer is high as compared with the remainder of the fluorescent layer.

There is no particular restriction as to the X-ray phosphor to be employed for the intensifying screen of the present invention. Any conventional phosphor may be used which is capable of instantaneously emitting a light of high luminance when excited by X-ray radiation, including a tungstate phosphor such as $M^{II}WO_4$, $M^{II}WO_4:Pb$ (wherein $M^{II}$ is at least one member selected from the group consisting of Ca, M9, Zn and Cd), a rare earth oxyhalide phosphor or a rare earth oxysulfide phosphor represented by the formula $M_{(w-n)}.M'_nO_wX$ (wherein M is at least one member selected from the group consisting of Y, La, Gd, and Lu, M' is at least one member selected from the group consisting of Ce, Dy, Er, Eu, Ho, Nd, Pr, Sm, Tb, Tm and Yb, X is sulfur or halogen, n is from 0.0002 to 0.2, and w is 1 when X is halogen and 2 when X is sulfur), an alkaline earth complex fluorohalide phosphor such as $BaFX:Eu^{2+}$, $(Ba,Me)FX:Eu^{2+}$, $BaF_2.pMeX_2.qKX'.rM'eSO_4:rEu^{2+}$ (wherein Me is at least one member selected from the group consisting of Mg, Ca and Sr, M'e is at least one member selected from the group consisting of Ca, Sr and Ba, each of X and X' is at least one member selected from the group consisting of Cl and Br, p, q and r are numbers satisfying $0.80 \leqq p \leqq 1.5$, $0 \leqq q \leqq 2.0$ and $0 \leqq r \leqq 1.0$, respectively), a phosphate phosphor such as $LnPO_4:Tb$ (wherien Ln is at least one member selected from the group consisting of La, Y and Gd), $(Ba,Sr)_3(PO_4)_2:Eu^{2+}$ and $HfP_2O_7:Cu$, a tantalate phosphor and a niobate phosphor represented by the formula $Ln'(Ta_{1-x},Nb_x)O_4:Tm$ or $Ln'(Ta_{1-x},Nb_x)O_4:Tb$ (wherein Ln' is at least one member selected from the group consisting of Y, Gd and Lu), a sulfide phosphor such as ZnS:Ag or (Zn,Cd)S:Ag, a sulfate phosphor such as $BaSO_4:Pb$ or $(Ba,Sr)SO_4:Eu^{2+}$, and an iodide phosphor such as CsI:Tl, NaI:Tl or KI:Tl.

As the binder resin constituting a part of the fluorescent layer in the intensifying screen of the present invention, those commonly employed for the fluorescent layers of conventional intensifying screens may be used alone or in combination as a mixture of two or more different kinds. Specifically, the binder resin may be cellulose nitrate, cellulose acetate, ethyl cellulose, polyvinyl acetate, polyvinyl butyral, linear polyester, a vinyl chloride-vinyl acetate copolymer, polycarbonate, polyurethane, polymethyl methacrylate, cellulose acetate butyrate, polyvinyl alcohol or a mixture thereof.

The solvent useful for the preparation of the coating dispersion of the phosphor may be an alcohol such as methanol, ethanol, propanol or butanol, a ketone such as acetone, methyl ethyl ketone or cyclohexanone, an ether such as methyl ethyl ether or ethyl ether, an ester such as ethyl acetate or butyl acetate, xylene or a mixture thereof. Among them, it is particularly preferred to employ a solvent having a relatively slow drying property such as cyclohexanone, butanol, butyl acetate or xylene.

The coating dispersion of the phosphor is prepared by mixing the above X-ray phosphor, the binder resin and the solvent, further adding, if necessary, a dispersant such as phthalic acid, stearic acid or a lipophilic surfactant and a plasticizer such as a phospholic acid ester such as triphenyl phosphate, a phthalic acid ester such as diethyl phthalate or glycolic acid ester such as butylphthalylbutyl glycolate, which are commonly used as additives for the formation of fluorescent layers of conventional intensifying screens, and thoroughly mixing the mixture. The mixing ratio of the X-ray phosphor and the binder resin may be optionally changed. However, in order to obtain adequate adhesive strength between the fluorescent layer and the protective layer, the proportion of the binder resin to the X-ray phosphor is preferably at least 4% by weight on the average of the entire fluorescent layer even under the condition that the binder resin is unevenly distributed to the protective layer side of the fluorescent layer. Further, in order to improve the sharpness of the resulting intensifying screen, it is preferably at most 8% by weight on the average of the entire fluorescent layer. Further, it is preferred to control the amount of the solvent to bring the viscosity of the coating dispersion of the phosphor to a level of not higher than about 7,000 cP i.e. lower than the viscosity of a conventional phosphor coating dispersion, so that when the coating dispersion of the phosphor is coated on a support, a part of phosphor particles is sedimented before the solution is completely dried and solidified so that when dried, the content of the binder resin in the vicinity of the surface of the fluorescent layer is higher than that of the remainder of the fluorescent layer.

To dry the coating dispersion of the phosphor coated on the support, it is preferred to conduct the drying by taking a sufficient time, for instance, by gradually heating from room temperature while controlling the substitution of the ambient air without adopting rapid drying such as blowing hot air immediately after the coating. Particularly when a coating dispersion of the phosphor with a viscosity being not so low is coated on a support, it is necessary to control the drying rate of the phosphor coating solution so that during the drying process of the coating dispersion of the phosphor, phosphor particles are permitted to sediment to a proper extent before the phosphor coating dispersion is completely solidified.

For forming on a support a fluorescent layer in which a binder resin is unevenly distributed so that it is present in a relatively large amount at the protective layer side, during the preparation of the intensifying screen of the present invention, it is possible to employ a method of controling the viscosity of the coating dispersion of the phosphor or the drying rate of the coating solution on the support, as mentioned above, or to employ a method wherein two types of coating dispersions of the phosphors differring in the content (to the weight of the X-ray phosphor) of the binder resin (the average value of the binder resin contents of the respective coating dispersions of the phosphors being within a range of from 4 to 8% by weight to the X-ray phosphor) are preliminarily prepared, and the coating dispersion of the phosphor having a low binder resin content is firstly coated and dried on a support, and the coating dispersion of the phosphor having a high binder resin content is coated and dried thereon. When the fluorescent layer is prepared by this latter method, the solvent for the coating dispersion of the phosphor is not required to be of a slow drying type and may freely be selected among known solvents. Needless to say, the coating dispersion of the phosphor may be prepared at an optional viscosity, and it is unnecessary to control the drying rate of the coating dispersion of the phosphor coated on the substrate.

Irrespective of which one of the above methods is employed for the preparation of the fluorescent layer, the content (to the X-ray phosphor) of the binder resin in the vicinity of the surface of the fluorescent layer (the protective layer side) is preferably higher by more than 1.1 times than that of the remainder of the fluorescent layer, in order to maintain the adhesive strength between the protective layer and the fluorescent layer having a binder resin content of not higher than 8% by weight (to the X-ray phosphor), at a practically satisfactory level.

Then, a film of a synthetic resin such as polyethyleneterephthalate, polyvinylidene chloride, polyethylene or polyamide having an adhesive preliminarily coated, is bonded on the surface of the fluorescent layer formed on the support as described above, to obtain an intensifying screen of the present invention.

Now, the present invention will be described in further detail with reference to Examples. However, it should be understood that the present invention is by no means restricted by such specific Examples.

EXAMPLE 1

A liquid mixture (solvent) of butyl acetate and cyclohexane was added to a mixture comprising 100 parts by weight of $CaWO_4$ phosphor (X-ray phosphor) and 6 parts by weight of vinyl chloride-vinyl acetate copolymer (binder resin), and the mixture was thoroughly mixed to obtain a coating dispersion of the phosphor having a viscosity of 4,000 cP. Then, this coating dispersion of the phosphor was coated by a knife coater on a horizontally placed polyethyleneterephthalate sheet (support) having a thickness of 250 μm and having carbon black incorporated, so that the weight of the coated phosphor after drying would be about 50 $mg/cm^2$, and left to stand at room temperature for 15 minutes. Then, the coated layer was gradually heated over a sufficient period of time while circulating hot air to a final temperature of 80° C. and dried to form a fluorescent layer. Then, on this fluorescent layer, a transparent polyethyleneterephthalate film having a thickness of 9 μm and having an adhesive preliminarily coated on one side was bonded to obtain an intensifying screen (I).

EXAMPLE 2

A liquid mixture (solvent) of ethyl acetate, butyl acetate and acetone, was added to a mixture comprising 100 parts by weight of a $CaWO_4$ phosphor (X-ray phosphor) and 5 parts by weight of a vinyl chloride-vinyl acetate copolymer (binder resin), and the mixture was thoroughly mixed to obtain a coating dispersion of the phosphor having a viscosity of 15,000 cP. Then, this coating dispersion of the phosphor was coated by a knife coater on a horizontally placed polyethyleneterephthalate sheet (support) having a thickness of 250 μm and having carbon black incorporated, so that the weight of the coated phosphor after drying would be about 25 mg/cm$^2$, and then immediately dried by circulating hot air of about 40° C. therearound. Then, on this first fluorescent layer, a coating dispersion of the phosphor having the same composition as above except that the vinyl chloride-vinyl acetate copolymer (binder resin) was 7 parts by weight was coated so that the weight of the coated phosphor after drying would be about 25 mg/cm$^2$, and immediately dried under the same drying conditions as in the case of the formation of the above first fluorescent layer, to form a second fluorescent layer.

Then, on this second fluorescent layer, a transparent polyethyleneterephthalate film having a thickness of 9 μm and having an adhesive preliminarily coated on one side, was bonded to obtain an intensifying screen (II).

COMPARATIVE EXAMPLES 1 AND 2

A liquid mixture (solvent) of ethyl acetate, butyl acetate and acetone, was added to a mixture comprising 100 parts by weight of a $CaWO_4$ phosphor (X-ray phosphor) and 6 parts by weight of a vinyl chloride-vinyl acetate copolymer (binder resin), and the mixture was thoroughly mixed to obtain a coating dispersion of the phosphor having a viscosity of 15,000 cP. Then, this coating dispersion of the phosphor was coated by a knife coater on a horizontally placed polyethyleneterephthalate sheet (support) having a thickness of 250 μm and having carbon black incorporated, so that the weight of the coated phosphor after drying would be 50 mg/cm$^2$, and immediately dried by circulating hot air of about 40° C. therearound and then heated to 80° C. to completely dry it to form a fluorescent layer. Then, to this fluorescent layer, a transparent polyethyleneterephthalate film having a thickness of 9 μm and having an adhesive preliminarily coated on one side, was bonded to obtain an intensifying screen (R-I).

Separately, an intensifying screen (R-II) was prepared in the same manner as the above intensifying screen (R-I) except that 12 parts of a vinyl chloride-vinyl acetate copolymer (binder resin) was used instead of 6 parts of the vinyl chloride-vinyl acetate copolymer.

With respect to the intensifying screens (I), (II), (R-I) and (R-II) obtained in Examples 1 and 2 and Comparative Examples 1 and 2, the adhesive strength of the protective layer, the binder resin distribution and the sharpness were evaluated in accordance with the following method.

(1) Adhesive strength of the protective layer

Cross cut lines were imparted with a razor blade from above the protective layer of an intensifying screen to divide the protective layer into 100 rectangular sections. Then, an adhesive tape (Scotch tape) was adhered to the surface of this protective layer and then peeled, whereupon the number of rectangular protective layer sections remained on the fluorescent layer without being peeled, was counted. The adhesive strength was relatively evaluated on the basis that the greater this number, the stronger the adhesive strength of the protective layer.

(2) Binder resin distribution

The protective layer and the support of an intensifying screen were peeled off, and the fluorescent layer was scraped off from each of the surface which was in contact with the protective layer and the surface which was in contact with the support. Each of the samples thus obtained was heated in a thermobalance, and from the weight reduction, the content (to the weight of the X-ray phosphor) of the binder resin in each fluorescent layer sample was determined, whereupon the ratio of the binder resin content in the fluorescent layer at the support side to the binder resin content in the fluorescent layer at the protective layer side was calculated.

(3) Evaluation of sharpness

By using each intensifying screen and an X-ray photographic film, an X-ray test chart for evaluation of the image quality was photographed and developed, and from the X-ray photographic film thus developed, MTF value was obtained. The sharpness was evaluated by relatively comparing the MTF values at 2 lines/mm.

The results thereby obtained are shown in Table 1.

TABLE 1

| Intensifying screen No. | Adhesive strength (Number of non-peeled rectangular sections of the protective layer) | Binder resin distribution (Protective layer side/ support side) | Sharpness (Relative MTF value) |
|---|---|---|---|
| (I) | 100 | 1.3 | 100 |
| (II) | 100 | 1.4 | 99 |
| (R-I) | 25 | 1.0 | 100 |
| (R-II) | 100 | 1.0 | 89 |

As is evident from Table 1, even if the average content of the binder resin in the fluorescent layer is the same, the adhesive strength between the protective layer and the fluorescent layer in each of the intensifying screen (I) and (II) wherein the binder resin content in the vicinity of the protective layer is relatively large as compared with the content in the remainder, is enhanced over the intensifying screen (R-I) wherein the binder resin is substantially uniformly distributed throughout the fluorescent layer. Further, as compared with the intensifying screen (R-II) wherein the binder resin content is increased and the increased amount of the binder resin was uniformly distributed throughout the fluorescent layer, the intensifying screens (I) and (II) are capable of providing remarkably improved sharpness although the adhesive strength between the protective layer and the fluorescent layer is the same.

In the intensifying screen of the present invention, the content of the binder resin in the fluorescent layer is reduced, and the binder resin is unevenly distributed to the protective layer side so that the binder resin content in the fluorescent layer in the vicinity of the protective layer is larger than the content in the remainder, whereby it is equal or superior in the sharpness to conventional intensifying screens, and yet the adhesive strength between the protective layer and the fluorescent layer is increased and peeling of the protective layer by repeated use can remarkably be reduced.

What is claimed is:

1. A radiographic intensifying screen which comprises a support, a fluorescent layer formed thereon comprising an X-ray excitable phosphor and a binder resin supporting the X-ray luminescent phosphor in a dispersed state, and a protective layer formed on the fluorescent layer, wherein the proportion of the binder resin to the X-ray luminescent phosphor is with a range of from 4 to 8% by weight on the average of the entire fluorescent layer, and the binder resin is distributed in the fluorescent layer so that the proportion of the binder resin to the X-ray luminescent phosphor in the fluorescent layer near the interface of the protective layer is higher than the proportion of the binder resin to the X-ray luminescent phosphor near the interface of the support layer and throughout the remainder of the fluorescent layer.

2. The radiographic intensifying screen according to claim 1, wherein the proportion of the binder resin to the X-ray luminescent phosphor in the fluorescent layer in the vicinity of the protective layer is higher by more than 1.1 times than the proportion of the binder resin to the X-ray luminescent phosphor in the remainder of the fluorescent layer.

3. The radiographic intensifying screen according to claim 1, wherein the X-ray luminescent phosphor is a tungstate phosphor, a rare earth oxyhalide phosphor, a rare earth oxysulfide phosphor, an alkaline earth complex fluorohalide phosphor, a phosphate phosphor, a tantalate phosphor, a niobate phosphor, a sulfide phosphor, a sulfate phosphor or an iodide phosphor.

4. The radiographic intensifying screen according to claim 1, wherein the binder resin is cellulose nitrate, cellulose acetate, ethyl cellulose, polyvinyl acetate, polyvinyl butyral, linear polyester, vinyl chloride-vinyl acetate copolymer, polycarbonate, polyurethane, polymethyl methacrylate, cellulose acetate butyrate, polyvinyl alcohol or a mixture thereof.

5. The radiographic intensifying screen according to claim 1, wherein the X-ray luminescent phosphor is a $CaWO_4$ phosphor and the binder resin is a vinyl chloride-vinyl acetate copolymer.

* * * * *